United States Patent Office 3,337,911
Patented Aug. 29, 1967

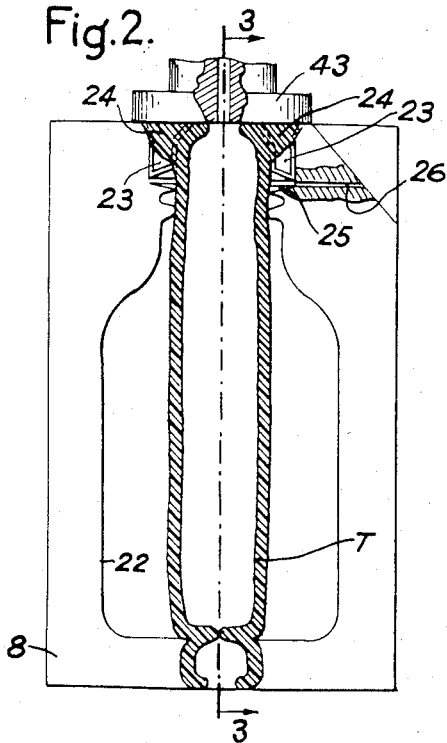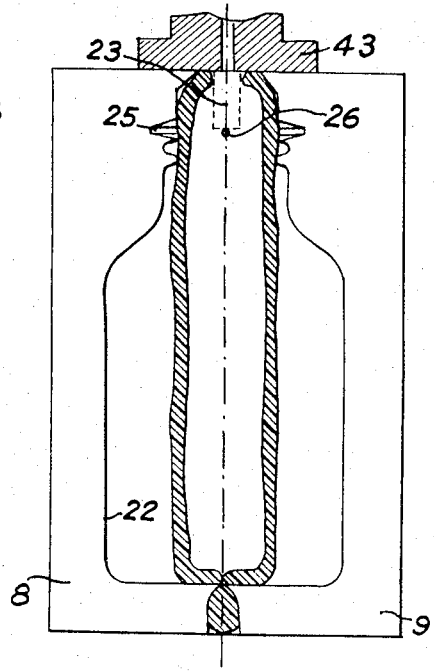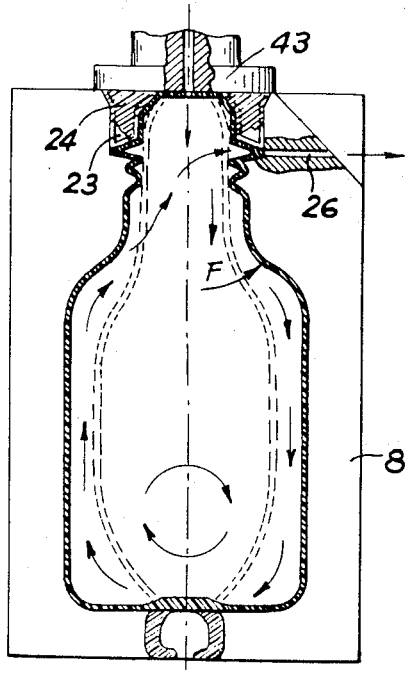

3,337,911
MOLD OF A MACHINE FOR MANUFACTURING PLASTIC CONTAINERS
Antoine Di Settembrini, 42 Residence du Petit Val, Sucy-en-Brie, France
Filed Oct. 6, 1964, Ser. No. 401,808
Claims priority, application France, Nov. 21, 1963, 954,541, Patent 1,392,517; July 10, 1964, 981,455, Patent 86,861
1 Claim. (Cl. 18—5)

ABSTRACT OF THE DISCLOSURE

In a machine for molding thermoplastic bottles by extrusion and blowing, which comprises an extruder producing a tubular plastic parison along a vertical extrusion axis, a plurality of molds moving in succession under said extruder, the improvement consisting in that the impression of each mold comprises a circular V-shaped groove wherein a degassing duct opens.

---

This invention relates to the manufacture of plastic containers and has specific reference to a machine designed for manufacturing plastic bottles.

This machine pertains to the known type wherein a number of molds are conveyed continuously past an extruder producing a tubular blank or parison of plastic material. Each mold is re-closed in succession on a parison section and the latter is subjected within the mold to an expansion by internal blowing so as to take the exact shape of the mold impression which corresponds to that of the desired bottle. Subsequent to this shaping step and after a sufficient cooling time the mold is opened to permit the stripping and release of the shaped bottle, and the same cycle is resumed with a fresh mold.

The object of the present invention is to improve the molds of the aforesaid machine in order to easily deodorize the manufactured bottles subsequent to the blowing step without requiring any additional step for the degassing operation.

Other features and advantages of this invention will appear as the following description proceeds with reference to the accompanying diagrammatic drawings in which:

FIGURE 2 is a part-sectional view showing the molding impression of a mold subsequent to the introduction of a fresh parison into same;

FIGURE 3 is a view taken in the direction of the arrows 3—3 of FIGURE 2;

FIGURE 4 is a view corresponding to FIGURE 2 showing the same mold after the blank has been expanded by blowing to impart a hollow bottle shape thereto.

Figure 1:
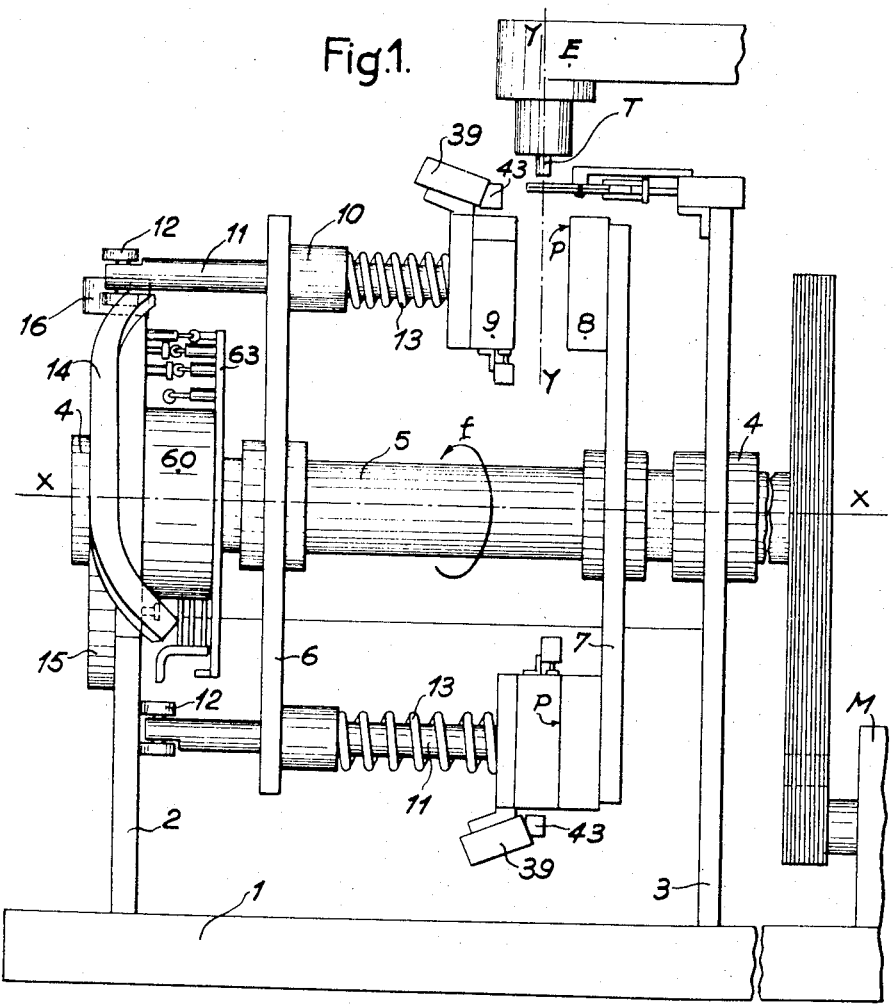
FIGURE 1 is a diagrammatic elevational view showing a typical form of embodiment of a machine constructed according to the teachings of this invention.

The machine according to this invention comprises a frame structure consisting essentially of a base plate or bed 1 and a pair of parallel vertical side flanges 2, 3. These flanges carry bearings 4 in which a main shaft 5 is journalled for rotation about the axis X—X; this shaft 5 is driven continuously in the direction of the arrow $f$ from a motor and variator unit M through adequate belt and pulley transmission means.

The extruder unit E shown only in very diagrammatic form in the drawing is carried by the aforesaid frame structure. The extrusion head is disposed according to a vertical axis Y—Y intersecting the axis X—X of shaft 5 and therefor extends radially thereto. This extruder E produces a tubular blank or parison T for example of rigid polyvinyl chloride.

The machine comprises furthermore a rotary mold support, the molding impressions or cavities of these molds having the shape and dimensions of the bottles to be manufactured. This support may assume substantially the shape of a rotary drum.

The rotary mold support mounted on shaft 5 consists of a pair of parallel vertical circular plates 6, 7 rigid with shaft 5 and carrying metal molds. In this example the support carries six molds, but it is clear that this number is not critical. The molds disposed at spaced annular intervals at the outer periphery of the plates consist of two portions or mold halves, that is, a fixed half-mold 8 and a movable half-mold 9, these half-molds being separated from each other by a vertical joint plane P. Plate 7 carries the fixed half-molds 8 secured thereon (on the side of the extruder E) and plate 6 carries the movable half-molds 9 but so mounted as to be movable in a direction parallel to the shaft axis X—X. To this end the plate 6 carries on its outer peripheral portion as many sockets 10 as there are molds in the machine. These sockets register with the fixed half-molds 8. Each socket 10 has slidably mounted therein a rod 11 carrying at one end the corresponding movable half-mold 9 and at the opposite end a pair of rollers 12 engaging a cam face of the mold opening and closing mechanism to be described presently. Each movable half-mold 9 is resiliently urged to its closed position, that is, in engagement with the corresponding fixed half-mold, by a return coil spring 13 surrounding the rod 11 and reacting between the movable half-mold 9 and the relevant socket 10, as shown.

The movement of translation parallel to the axis X—X which is thus imparted to the movable mold halves 9 for opening and closing the molds is obtained by using mechanical means comprising a cam member 14 carried by an annular plate 15 concentric with the axis X—X and secured on the lateral flange 2 of the frame structure of the machine.

The molding unit associated with each mold is mounted on the upper portion of the mold. The blowing members are of retractable type as they are mounted on one of the half-molds and should permit the closing of the molds without interfering with the passage thereof under the extruder. In fact, care must be taken to prevent the blowing members from striking the extrusion head.

The arrangement comprises as many blowing units as there are molds in the machine. Each blowing unit comprises a pneumatic cylinder 39 actuating a blowing head 43 adapted to fit on the upper portion of the mold closed straddlewise on the joint plane P.

The inner cavity of each mold shown in FIGURES 2 to 4 of the drawings comprises, in addition to the impression proper 22 for molding the bottle F, a pair of upper pinching cavities 23 in the neck region of the bottle, for the purpose of holding the tubular blank T in position during the blowing operation. These pinching cavities 23 consisting of recesses overlying the neck on either side thereof and connected to the joint plane P by bevelled portions to form pinching ribs therewith, produce during the molding step a pair of opposite ears 24 for guiding and positioning the tubular parison T in the mold. These guiding and positioning ears are spaced from the bottle body proper by constrictions resulting from the aforesaid pinching ribs. Between the pinching cavities 23 and the bottle neck impression a circular inner V-shaped groove 25 is formed.

According to this invention the groove 25 communicates with a gas release passage 26 opening to the outside of the mold. A gas release passage may be formed in only one or both mold halves. If desired, a plurality of these gas release passages may be provided. The diameter of passage 26 is proportional to the thickness of the bottle to be manufactured; the greater this thickness, the greater the passage diameter; by way of example, in the manufacture of bottles 1 having a wall thickness of about 0.012" the diameter of the gas release passage may be about 0.08".

The gases trapped in the still hot and soft plastic material by occlusion, of which a considerable quantity is released during the blowing operation, are strongly stirred and, due to the internal overpressure developing in the blown bottle F (see FIGURE 4) the soft wall of this bottle is perforated at the level of the gas release passage 26 and vented therethrough. The stirring, circulation and venting of the internal gases are shown by the arrows in FIGURE 4. By virtue of this passage 26 the bottle F is easily deodorized subsequent to the blowing step without requiring any additional step for the degassing operation. Under these conditions it is clear that the degassing passages provide an additional improvement as to the quality of the liquid products to be subsequently enclosed in the bottle.

Although the specific forms of embodiment shown and described herein refer to a six-mold machine wherein the molds are disposed at spaced intervals on a concentric rotary plate, it is obvious for anybody conversant with the art that this invention is also applicable to a machine comprising a different number of molds as consistent with the desired production rate and the dimensional characteristics of the plate, and also with the operation of the extruder.

Finally, the machine of this invention is also suitable for use in the manufacture of bottles of any desired thermoplastic material, whether organic or inorganic, that is, any material adapted to soften in a reversible manner under the action of heat.

What I claim is:

In a machine for molding thermoplastic bottles by extrusion and blowing, which comprises an extruder producing a tubular plastic parison along a vertical extrusion axis, a plurality of molds moving in succession under said extruder, each mold consisting of two half-molds movable in relation to each other and having the impression of the bottle to be manufactured therein, said mold impression comprising cavities for pinching said tubular plastic parison and a bottle neck impression, at least one degassing duct extending through the wall of one of said half-molds and opening on the one hand into said impression and on the other hand outside said half-mold, and blowing means associated with each mold, the improvement consisting in that the impression comprises a circular V-shaped groove wherein said degassing duct opens.

References Cited

UNITED STATES PATENTS

| | | | |
|---|---|---|---|
| 2,579,399 | 12/1951 | Ruekberg | 18—5 |
| 3,005,231 | 10/1961 | Pechthold | 18—5 |
| 3,114,931 | 12/1963 | Pelikan | 18—5 |
| 3,246,062 | 4/1966 | Scott et al. | 264—98 |

J. SPENCER OVERHOLSER, *Primary Examiner.*

WILBUR L. McBAY, *Examiner.*